United States Patent [19]

Bryan

[11] Patent Number: 4,775,510

[45] Date of Patent: Oct. 4, 1988

[54] NUCLEAR FUEL ASSEMBLY HOLLOW FLOW DEFLECTOR

[75] Inventor: William J. Bryan, Granby, Conn.

[73] Assignee: Combustion Engineering, Inc., Windsor, Conn.

[21] Appl. No.: 944,098

[22] Filed: Dec. 22, 1986

[51] Int. Cl.⁴ ............................................. G21C 3/32
[52] U.S. Cl. .................................... 376/443; 376/439
[58] Field of Search ................................ 376/443, 439

[56] References Cited

U.S. PATENT DOCUMENTS 4,313,797  2/1982  Attix .................................... 376/439

FOREIGN PATENT DOCUMENTS 1563494  4/1969  France ................................ 376/443

Primary Examiner—Donald P. Walsh
Attorney, Agent, or Firm—John H. Mulholland

[57] ABSTRACT

A hollow flow deflector (10) for use in a nuclear reactor fuel assembly having spaced grids of orthogonal strips (16, 18) mounted for defining square matrices of aligned and supported cylindrical fuel elements (12, 14). The deflector has a central cylindrical opening (20), an upstream end portion (22), a downstream end portion (24) and an intermediate transition portion (26) joining the end portions. The hollow flow deflector (10) has a plurality of concave flow channels (30) regularly spaced about the periphery of the body in its downstream end portion. The flow channels (30) have their inlet portion defined in the transition portion (26) of the body (10).

5 Claims, 3 Drawing Sheets

NUCLEAR FUEL ASSEMBLY HOLLOW FLOW DEFLECTOR

BACKGROUND OF THE INVENTION

This invention relates to nuclear fuel assemblies of the type typically used in light water reactors, and more particularly, to a hollow flow deflector which improves the heat transfer between the fuel and moderating coolant medium passing through the fuel assembly.

The importance of critical heat flux in the design of nuclear fuel assemblies and in the operation of commercial nuclear power plants is well known to practitioners in the field of nuclear power. Considerable design and testing efforts are directed toward optimizing the fuel assembly thermal-hydraulic performance, while minimizing the effects of fuel assembly structure on the neutronics performance of the fuel. Typical fuel assemblies for commercial light water nuclear power reactors have a plurality of grids for defining square matrices of aligned and supported fuel rods which are spaced apart sufficiently to permit flow between the rods thereby to transfer heat to the fluid medium. The thermal-hydraulic optimization effort is directed toward maximizing heat transfer without approaching the critical heat flux, which condition results in a precipitous drop in the heat transfer coefficient between the rod and the fluid and a significant rise in the fuel clad temperature. Fuel assembly design changes that increase the critical heat flux provide the advantages of greater operating margin or increased core power rating.

Ideally, the velocity of the fluid is the same throughout the fuel assembly to guaranty that heat transfer from the fuel rods to the coolant fluid is maximized and local hot spots and the premature occurrence of boiling are prevented. This is important because premature occurrence of boiling reduces the possible level of energy production. Inherently, under axial flow conditions and without flow deflector structures, the flow velocity in the square matrices is less in the gaps between the in-line adjacent rods than in the wider gaps between the diagonally adjacent rods of the square matrix. Therefore, circumferential variations in the fuel rod heat transfer and temperature distributions inherently occur. In addition, variations also occur between different sides and regions of a given fuel assembly. Such variations are, at least to some degree, dependent on the location of the individual fuel assembly within the reactor core.

To effect some degree of improvement in approaching the above stated ideal, fuel designers have engineered a large variety of mixing and flow directing devices. The various mixing devices, usually bent metal strip portions, have helped by increasing the critical heat flux and thereby retarding the first onset of the critical heat flux anywhere on the assembly when compared to the assembly without the mixing device. A limiting factor, however, is that fuel assembly mixer designs must not increase the pressure drop across the grids beyond that which is tolerable.

For over two decades, it has been recognized that the provision of flow deflector structure on the fuel assembly grids can promote fluid mixing and thereby increase the critical heat flux. U.S. Pat. No. 3,379,619 entitled "Fuel Assembly for Nuclear Reactors" typifies the early flow mixing tabs carried by the grids. Many variations of this tab flow mixer, possibly numbering in the hundreds, have been used or proposed by practitioners in this field. Virtually all such variations are designed to promote "inter-subchannel mixing". A subchannel is defined as the fluid path, or "channel", which is more or less enclosed by three or four fuel rods. Fluid in one subchannel can mix with the fluid in neighboring subchannels through the gaps between fuel rods. Inter-subchannel mixing is the term used to describe this mixing between subchannels. These types of flow deflectors are effective for maintaining sub-cooled conditions by mixing liquid at different temperatures.

German Pat. No. 1,244,981 and U.S. Pat. No. 3,847,736 "Flow Twister For A Nuclear Reactor", exemplify the less common approach of using flow deflection means that have the effect of fluid mixing within the subchannel, with relatively low inter-subchannel mixing.

U.S. Pat. No. 3,589,438 "Spacer Grid For Heat Exchanger Elements With Eddy Diffusion Promotion Means" teaches hexagonal fuel rod cells 18 containing fuel rods 10. Irregular edges 28 and 29 of strips 17 defining the cells 18 act as flow deflectors.

U.S. patent application Ser. No. 843,525 filed Mar. 24, 1986 by Parrette and Marshall and entitled "Nuclear Fuel Assembly Having Composite Mixing Grids" is assigned to the same assignee as the present application. The Parrette and Marshall application teaches an assembly in which a plurality of grids of a first type are spaced over the lower portion of a fuel assembly and at least one grid of a second type is located over these and has flow deflector structures associated with it for imparting a swirling motion within the flow subchannels to a greater extent than provided by the first type of grid.

Nuclear reactors normally have some regions in the core which have a higher neutron flux and power density than other regions. This situation may be caused by a number of factors, one of which is the presence of poison rods and another of which is the presence of control rod tubes or channels in subchannels of the core. When the control rods are withdrawn, these channels are filled with moderator and cooling fluid which increases the local moderating capacity and thereby increases the power generated in the adjacent fuel. In these regions of high power density known as "hot channels", there is a higher rate of enthalpy rise than in other subchannels. It is such hot channels that set the maximum operating conditions for the reactor and limit the amount of power that can be generated since it is in these channels that the critical thermal margin is first reached.

Although support grid structures having integrally formed mixing vanes improve by some degree, the coolant flow and heat transfer conditions that gave rise to the above-mentioned problems, they nonetheless cannot produce enough coolant mixing in the spaces between grids of present operating reactors, especially over particular high power producing fuel rod spans. Placing additional grids in the fuel structure results in an unacceptable increase in pressure loss experienced by the coolant flowing through the core.

It is toward the solution of producing specific areas of subchannel coolant mixing, particularly between grids, while minimizing pressure losses, that the present hollow flow deflector invention is directed. Attempts have been made in the past to solve these problems by providing the hollow tubes with other types of flow mixers and deflectors. A strip-type deflector, which extends to areas between the grids, is described in U.S. patent Ser.

No. 3,787,286 by A. J. Anthony, filed Dec. 17, 1971, and granted Jan. 22, 1974. However, this device has not been totally successful in producing the high degree of mixing required over a specific location of the core and in particular, between the grids in the subchannels.

SUMMARY OF THE INVENTION

The hollow flow deflector structure of the present invention is incorporated in a fuel assembly which includes fuel element support grids of the well-known "egg crate" construction for supporting an array of nuclear fuel elements and poison rods intermediate their ends. Each grid includes a plurality of fuel element or poison rod containing cells defined by first and second intersecting and slottedly interlocked grid-forming matrix strips. The grids are spaced apart and commonly mounted and welded on control rod guide tubes oriented parallel to the fuel rods within the square matrix.

The improved form of hollow flow deflector apparatus comprises metal tubes that are attached to the fuel assemblies at selected locations. The tubular flow deflectors contain angularly oriented vanes that extend into the flow channels and operate to deflect and otherwise mix coolant from the various channels in order to distribute the enthalpy rise in the coolant over the entire cross-section of the core.

The flow deflectors are arranged to be positioned at selected locations on the guide tubes and between the grids such that the vane projections operate in regions of the coolant flow channels requiring effective mixing of the coolant. The flow deflector apparatus of the invention, as compared with known apparatus of the prior art, is also effective in reducing the pressure loss experienced by the coolant in flowing through the reactor core.

The hollow flow deflectors themselves are elongated tubular bodies with an upstream end portion of a first overall transverse outer dimension, a downstream end portion of a second and greater overall transverse dimension, an intermediate transition portion joining the upstream end portion with the downstream end portion and at least one flow channel in the transition portion ending in the downstream end portion.

DETAILED DESCRIPTION OF THE PREFERRED EMBODIMENT

The numeral 10 generally designates the hollow flow deflector of the invention. It is illustrated in FIG. 1 as being mounted on a cylindrical element of a fuel assembly 12 which may typically be a thimble or guide tube of anuclear fuel assembly but which also may be one or more of the cylindrical fuel rods, poison rods or elements 14 making up the square matrix schematically shown in FIG. 2.

Figure 1:
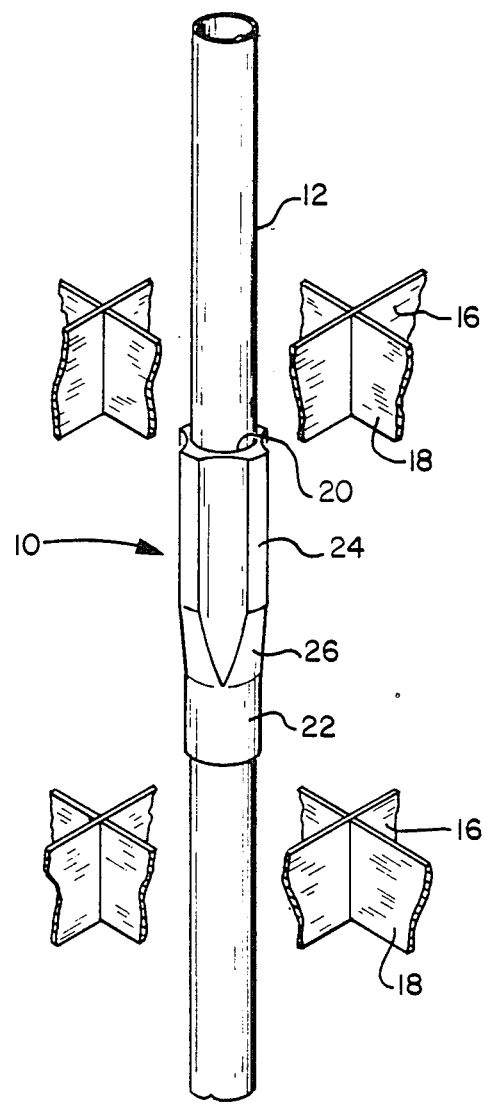
FIG. 1 is an isometric schematic view of a nuclear fuel assembly having the hollow flow deflector of the instant invention mounted on the cylindrical element of the fuel assembly between spaced grids.

The cylindrical fuel assembly element or thimble 12 and the fuel rods or poison rods 14 are supported in well-known manner intermediate their ends by a fuel support grid made up of orthogonal strips 16 and 18 as schematically shown in FIG. 1. Ideally, the hollow flow deflector is mounted on the cylindrical fuel assembly element between grids, as shown in FIG. 1, in order to provide the desired subchannel mixing.

The hollow flow deflector 10 includes an elongated hollow body with a central cylindrical opening 20 for engaging a cylindrical fuel assembly element 12 in tight fitting relationship therewith. As previously pointed out, while the hollow flow deflectors 10 are capable of attachment to any or all members of the fuel assembly, they are most conveniently mounted on each of these non-fuel bearing members or control element guide tubes 12. The deflectors can be attached to the hollow tubes by means of welding, bulging or other mechanical means.

The hollow flow deflector 10 has an upstream end portion 22 of a first diameter or overall transverse outer dimension. The term "upstream" originates from the fact that flow of coolant through the fuel assembly is from bottom to top, in a direction parallel to the axis of the cylindrical fuel assembly elements 12 and 14. The body of the hollow flow deflector 10 also includes a downstream end portion 24 of a second and greater overall transverse dimension and an intermediate transition portion 26 joining the upstream end portion 22 with the downstream end portion 24.

Figure 2:
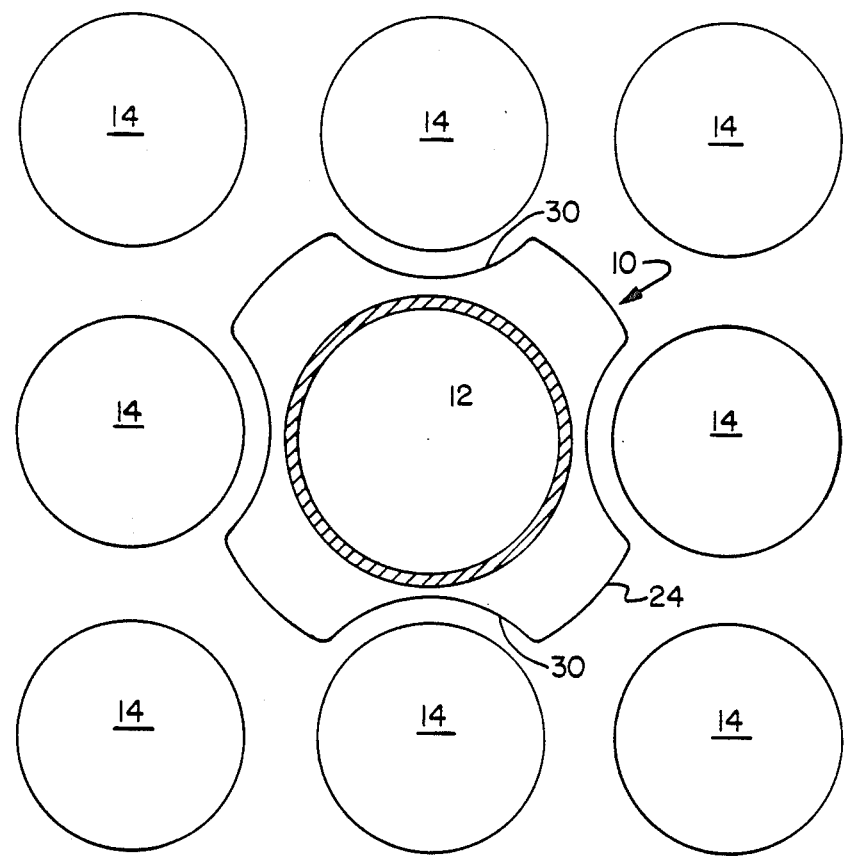
FIG. 2 is a schematic cross-sectional view of a square matrix of aligned and supported cylindrical fuel rods with a cylindrical thimble or guide tube in the interior portion of the matrix supporting a hollow flow deflector to promote fluid mixing and thereby increase the critical heat flux.
Figure 3:
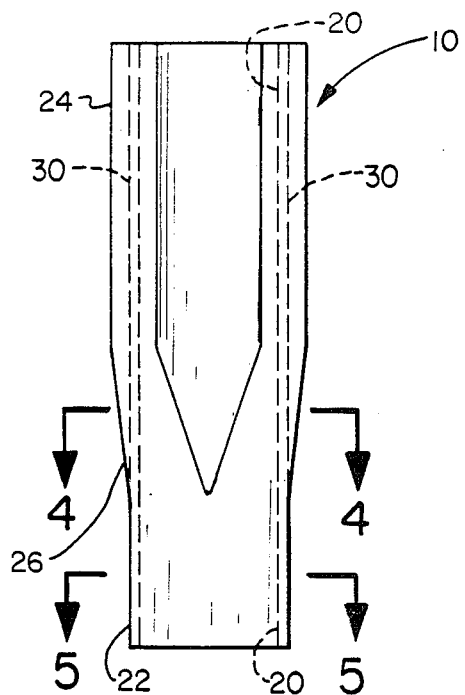
FIG. 3 is a side elevational view of a hollow flow deflector constructed in accordance with the invention.
Figure 4:
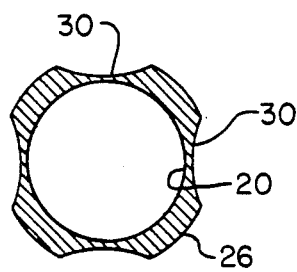
FIG. 4 is a cross-sectional view taken along the line 4—4 of FIG. 3.
Figure 5:
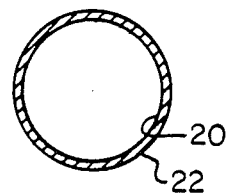
FIG. 5 is a cross-sectional view taken along the line 5—5 of FIG. 3.

The flow deflector 10 includes a plurality of flow channels or grooves 30 regularly spaced about the periphery of its body. As shown in FIG. 2, the flow channels are conveniently made concave in cross-section and extend at least through the transition portion and the downstream end portion. The cylindrical central opening 12, of course, extends through and from the upstream end portion through the transition portion into and through the downstream end portion to permit its mounting on the cylindrical fuel assembly element, whether it is a thimble 12 or a fuel rod 14. The flow deflector 10 is conveniently machined from a length of zircalloy tubing such that the flow channel 30 may be easily machined and the varying transverse outer dimensions of the upstream end portion 22, the transition portion 26, and the downstream end portion 24 can be provided without the expense of complexly shaped dies. The cutting tool marks from the machining operation are visible from a close inspection of the hollow flow deflector 10.

Thus, it will be seen that a hollow coolant flow deflector 10 is provided for diverting the flow of coolant fluid from one subchannel to another in order to promote mixing of the fluid. The deflectors are to be positioned at selected locations such that the vane projections formed by the flow channels 30 operate in regions of coolant flow of the fuel assembly where thermal hydraulic performance can be improved by local turbulence production, local coolant flow deflection or fuel assembly coolant flow deflection. The hollow deflectors 10 can be employed with the support grid structures to create a more effective mixing of the coolant without creating an objectionable degree of pressure-loss as the coolant flows through the reactor core, thereby resulting in reduced pumping requirements and concomitant plant operating costs.

Flow visualization tests and laser velocity measurements were performed with one hollow flow deflector design in a 7.35:1 scale, 6×6 matrix flow model in an air test facility. During the flow visualization tests, it was observed that the flow was deflected into the adjacent subchannel at the downstream end portion of the deflector. Based upon the laser velocity measurements, it was observed that at a distance of one hydraulic diameter after the deflector, the turbulence level in the guide tube subchannel was increased by up to 50% and the flow was slanted towards the guide tube in the wake of the deflector, filling the void adjacent to the guide tube. At a distance of five hydraulic diameters after the deflector, the velocity profile and turbulence levels returned to the normal valves without the deflector. Thus, the flow deflection and increased turbulence in the vicinity of the hollow flow deflector clearly will improve the heat transfer between the fuel adjacent to the guide tube and the moderating coolant medium in that region.

I claim:

1. A hollow deflector in combination with a nuclear reactor fuel assembly having spaced grids for defining square matrices of aligned and supported cylindrical fuel assembly elements spaced apart to permit flow in subchannels between the elements thereby to transfer heat to a fluid coolant medium, said flow deflector comprising:

an elongated hollow body mounted on a cylindrical element of a fuel assembly between spaced grids;
   a downstream end portion of said body of a first overall transverse outer dimension;
   an upstream end portion of a second and greater overall transverse dimension;
   an intermediate transition portion joining the downstream end portion with the upstream end portion; and,
   at least one flow channel in said transition portion and ending in said upstream end portion.

2. The combination of claim 1 in which the hollow body has a cylindrical central opening extending through and from said upstream end portion, through said transition portion and to and through said downstream end portion.

3. The hollow flow deflector of claim 1 in which a plurality of flow channels are regularly spaced about the periphery of the body.

4. The combination of claim 1 in which the flow channels are concave in cross section.

5. The combination of claim 1 in which the hollow body is a length of machined stock having visible cutting tool marks.

* * * * *